United States Patent [19]
Vertin

[11] 3,720,115
[45] March 13, 1973

[54] MACHINE ELEMENT DRIVE MEANS

[76] Inventor: Thomas D. Vertin, 37540 Lake Shore Rd., Mount Clemens, Mich. 48043

[22] Filed: Feb. 16, 1971

[21] Appl. No.: 115,586

[52] U.S. Cl. ...................74/424.6, 74/415, 74/422, 74/440, 74/458, 74/465
[51] Int. Cl. .........F16h 1/18, F16h 1/04, F16h 55/18
[58] Field of Search.....74/424.6, 415, 458, 465, 464, 74/440, 422

[56] References Cited

UNITED STATES PATENTS

| | | | |
|---|---|---|---|
| 647,491 | 4/1900 | Hoffmann | 74/465 |
| 1,421,580 | 7/1922 | Seemann | 74/458 |
| 2,273,784 | 2/1942 | Kahl | 74/458 X |
| 2,714,315 | 8/1955 | Reader et al. | 74/458 X |
| 2,734,393 | 2/1956 | Luenberger | 74/425 |
| 3,242,756 | 3/1966 | Fry | 74/425 |
| 3,495,470 | 2/1970 | McCartin | 74/465 X |
| 3,581,592 | 6/1971 | Roehrs et al. | 74/424.6 |

FOREIGN PATENTS OR APPLICATIONS

| | | | |
|---|---|---|---|
| 1,111,905 | 7/1961 | Germany | 74/465 |
| 542,470 | 1/1942 | Great Britain | 74/458 |

*Primary Examiner*—Leonard H. Gerin
*Attorney*—Donnelly, Mentag & Harrington

[57] ABSTRACT

A machine element drive means for moving one machine element, as a column, relative to another machine element, as a base, including a gear rack means on one of said machine elements and a rotatable drive worm on the other of said machine elements in driving engagement with the gear rack means, whereby when said drive worm is rotated, a relative movement between the machine elements is produced. The gear rack means may be provided with square teeth and the drive gear worm with teeth formed from a plurality of rotatably mounted studs, or the gear rack may have teeth formed from a plurality of rotatably mounted studs and the drive worm be provided with square teeth.

40 Claims, 26 Drawing Figures

INVENTOR
THOMAS D. VERTIN
BY
Donnally, Mentag & Harrington
ATTORNEYS

INVENTOR.
THOMAS D. VERTIN
BY
Donnelly, ˍˍˍ
ATTORNEYS

INVENTOR.
THOMAS D. VERTIN
BY
Donnelly, Mentag & Harrington
ATTORNEYS

PATENTED MAR 13 1973 3,720,115

INVENTOR.
THOMAS D. VERTIN
BY
Donnelly, Mentag & Harrington
ATTORNEYS

MACHINE ELEMENT DRIVE MEANS

SUMMARY OF THE INVENTION

This invention relates generally to a drive means for a machine tool and more particularly to a drive means for moving one machine element relative to another machine element.

The provision of drive worm and gear rack drive means is known in the machine tool art for moving one machine element relative to another machine element. A disadvantage of such known machine element drive means is that the tolerances between the meshing parts of the drive worm and the gear rack permit excessive movement of one machine element relative to another during reversal movements. Such excess movement of one machine element relative to another presents a problem in a machine which is operative for moving a tool over a workpiece having a curved surface or contour wherein the movable machine element carrying the tool is reversed in a number of directions during the travel of the tool over the workpiece. Another disadvantage of the prior art gear rack means for a machine tool drive means is that special machines are needed to produce them and much time is required. Furthermore, the length to which a prior art gear rack can be made is limited since extremely long prior art gear racks tend to warp. Still another disadvantage of the prior art drive worm and gear rack drive means is that a large amount of power is required to initiate movement between the machine elements and to brake them.

The prior art drive worm and gear rack drive apparatuses develop a side thrust which is a disadvantage. The prior art drive worms, because of the small diameters employed, cannot provide fine resolutions or increments of travel. A further inherent disadvantage of the prior art worm and gear rack drive apparatuses is that only one tooth of the worm is in contact at any one time with the gear rack, so that only a single line contact is provided between the worm and the gear rack. The prior art worm and gear rack drive apparatuses require pressure to hold the worm in place on the gear rack, and such structures require a predetermined amount of backlash which results in interrupted cuts when the worm is reversed relative to the gear rack. A still further disadvantage of the prior art worm and gear rack drive apparatuses is that the worm in such apparatuses is of a small diameter and of a long length whereby, when the movement of a machine element is reversed, the long worm goes through an unwinding and winding effect which permits the movable machine element to stand still for a short period of time so that the working cut is interrupted and the tool is stationary relative to the workpiece, and a work hardening effect is created on the metal at that point. A further disadvantage of the prior art worm and gear rack drive apparatuses is that, because of the need for a backlash between the worm and gear rack, it is not possible to preload the worm relative to the gear rack, and therefore it is not possible to obtain a micro-finish on the workpiece. A still further disadvantage of the prior art worm and gear rack drive apparatuses is that, because of the friction involved between the worm and the gear rack, the mating surfaces must be of different degrees of hardness, so that one surface is softer than the other mating surface. In view of the foregoing, it is an important object of the present invention to provide a novel and improved machine element drive means which overcomes the aforedescribed disadvantages of the prior art machine element drive means.

It is another object of the present invention to provide a novel and improved machine element drive means which is compact and simple in construction, economical to manufacture and efficient in operation.

It is still another object of the present invention to provide a novel and improved machine element drive means which includes a gear rack which can be made precisely to any desired length, and which has no backlash or override so that a machine element can be moved with zero backlash and with a minimum of power for initiating movement of a machine element and for braking the machine element. The drive means is constructed and arranged to provide a minimum of wear between a drive worm and the gear rack, and to provide high accuracy which can be maintained over longer periods of time than is heretofore possible with the prior art drive means.

It is a further object of the present invention to provide a novel and improved machine element drive means which incorporates gear teeth formed from a plurality of rotatably mounted studs on one part of the drive means and meshing square gear teeth on the other part of the drive means, so as to provide the drive means with a minimum of friction between the meshing parts thereof. The drive worm includes two parts which may be adjusted relative to each other to provide a preload pressure on the worm and gear rack to hold these parts together. The preload pressure on the worm and gear rack may be adjusted to or above the cutting tool load whereby, when a machine element is reversed in the course of a cutting action there is no interruption in the cut on the workpiece being made by the tool, and there is no winding up and unwinding effect or torsion encountered in the drive worm. The drive worm may be made to a short length and with a large diameter so as to provide a fine resolution or increment of travel as, for example, a one-degree rotation of the drive worm may produce a 0.001-inch movement. The preloading of the drive worm on the gear rack of the present invention provides a plurality of contacts between the drive worm and the gear rack, and the side thrust is minimized and it is evenly distributed in the direction of travel on the gear rack. The drive worm may be made to a length much shorter than the prior art drive worms. The preloading of the worm on the gear rack permits a machine tool provided with the present invention to micro-finish surfaces of a workpiece, and the mating surfaces or contacting surfaces are hardened precision parts which are of equal degrees of hardness, because no friction is inherent in the worm and gear rack drive of the present invention. The worm in the drive means of the present invention may be driven by an in-line motor which may be internally disposed relative to the drive worm or externally disposed, so as to provide no lost motion which results in fine resolution or increments of movement.

It is still another object of the present invention to provide a novel and improved machine element drive means comprising a drive worm having teeth formed from a plurality of rotatably mounted studs which are meshed with square teeth formed on the gear rack means, or wherein the drive worm may be provided with square teeth and the gear track means with teeth formed from a plurality of rotatably mounted studs. The drive worm is formed from two parts to permit positive reversal action without excessive movement of a machine element when the drive means is reversed. The drive worm may be operatively mounted on the rotor of an electric motor for driving the drive worm. The square teeth on the gear rack may be formed from a plurality of separately formed tooth plates which are spaced apart by suitable spacer blocks so that the gear rack may be made to any desired length by using the desired number of tooth plates and spacer blocks.

It is a further object of the present invention to provide a gear rack drive means for moving one machine element relative to another machine element and which includes a first part comprising a gear rack means on one of the machine elements and which is provided with a plurality of teeth, a second part comprising a rotatable drive worm operatively mounted on the other of the machine elements and having teeth in meshing driving engagement with said gear rack means whereby when said drive worm is rotated in said gear rack means a relative movement between said machine elements is produced. One of said drive means parts is provided with teeth comprising a plurality of rotatably mounted studs, and the other of said drive means parts is provided with square teeth.

It is still a further object of the present invention to provide a gear rack drive means for moving one machine element relative to another machine element, which drive means incorporates gear teeth formed from a plurality of rotatably mounted studs which provide a drive means involving less maintenance with correspondingly less down-time and cheaper maintenance. The improved machine element drive means studs can be quickly and easily replaced individually, as required, so as to provide cheaper maintenance.

Other objects, features and advantages of this invention will be apparent from the following detailed description, appended claims and the accompanying drawings.

DESCRIPTION OF THE PREFERRED EMBODIMENTS

Figure 1:
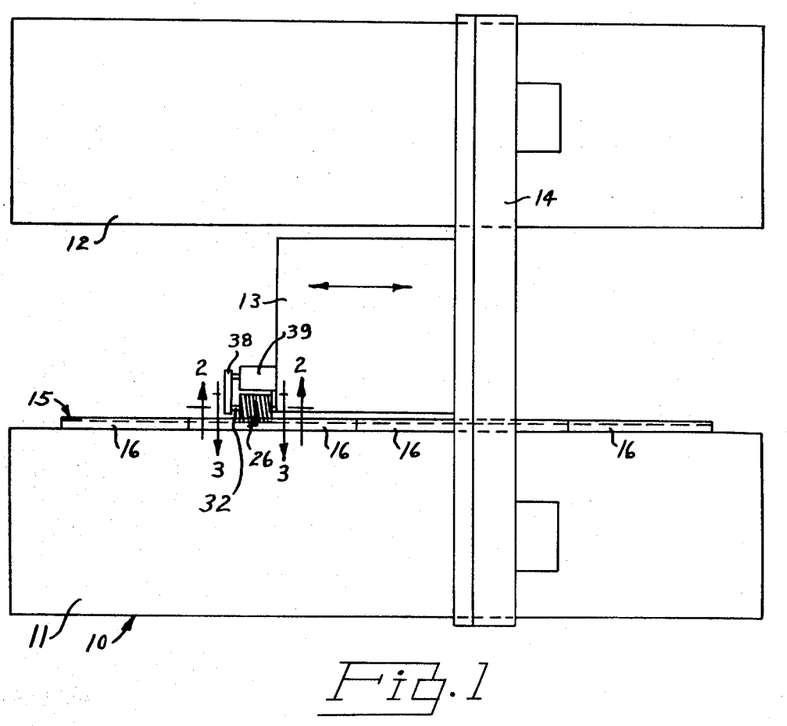
FIG. 1 is a top plan view of a machine tool provided with an illustrative embodiment of the invention.

Referring now to the drawings, and in particular to FIG. 1, the numeral 10 generally designates a milling machine provided with a pair of stationary tables 11 and 12, a movable vertical machine column 13 and a bridge 14. The details of the machine have not been shown since they do not form any part of the invention. It will be further understood that the drive means of the present invention may be incorporated in any machine, and that it can be used for moving machine elements on a horizontal plane, a vertical plane or on an angular plane relative to the horizontal and vertical planes.

The numeral 15 generally designates a gear rack means made in accordance with the principles of the present invention, and it is mounted on one of the machine elements, namely the stationary table 11. The gear rack means 15 may be made to any desired length, and it may be made in sections, as indicated by the numerals 16.

Figure 3:
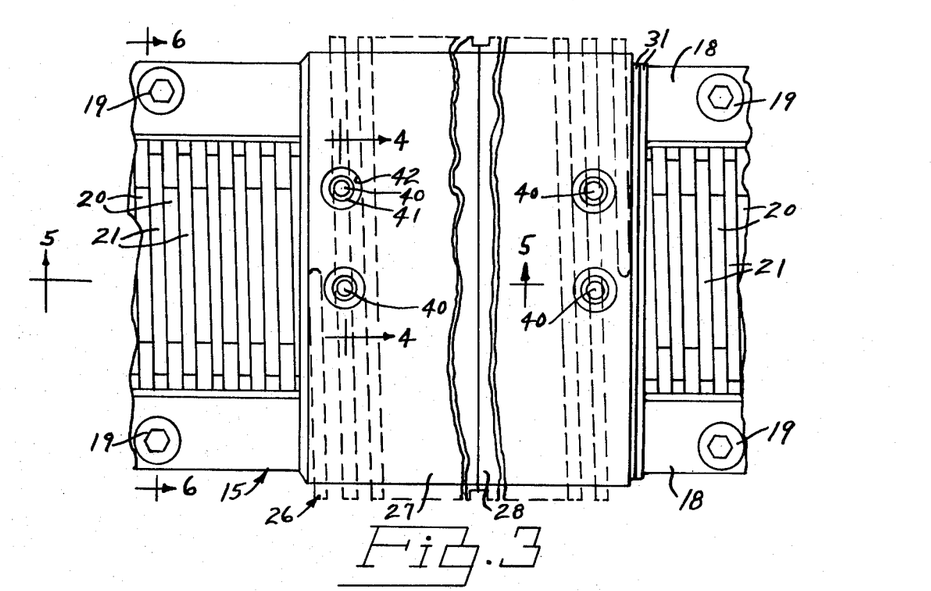
FIG. 3 is a fragmentary, enlarged, broken, elevational view of the structure illustrated in FIG. 1 taken along the line 3—3 thereof, and looking in the direction of the arrows.
Figure 5:
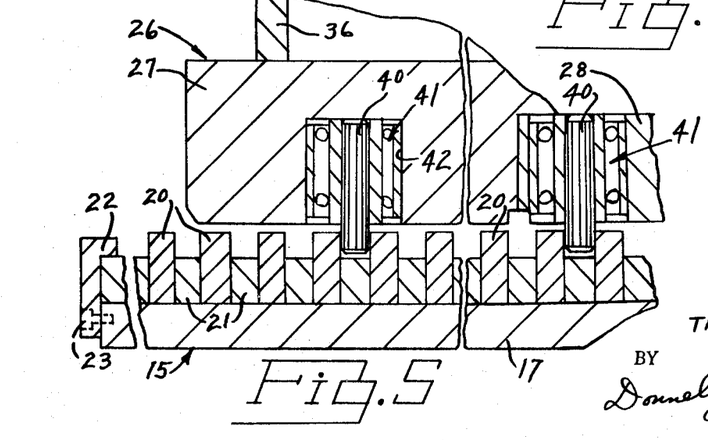
FIG. 5 is a fragmentary, enlarged, broken, elevational, section view of the structure illustrated in FIG. 3, taken along the line 5—5 thereof, and looking in the direction of the arrows.
Figure 6:
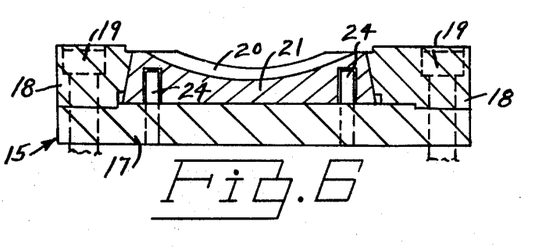
FIG. 6 is a fragmentary, elevational, section view of the structure illustrated in FIG. 3 taken along the line 6—6 thereof, and looking in the direction of the arrows.

As shown in FIG. 6, the gear rack means 15 includes an elongated mounting plate 17, which is secured to the stationary machine element 11 by a pair of keepers 18 and a plurality of socket head screws 19. As shown in FIGS. 3 and 5, the gear rack means 15 includes a plurality of block teeth 20 which are made in the form of square plates. The square gear rack teeth 20 are secured between the keepers 18 and are longitudinally spaced apart by spacer plates 21. As sown in FIG. 5, the square teeth 20 and the spacer plates 21 are secured on the mounting plate 17, at each end thereof, by any suitable means, as by an end clamp 22 which is secured to the mounting plate 17 by suitable socket head screws 23. Dowel pins as 24 (FIG. 6) may also be used to secure the gear rack spacer plates 21 in place.

The square teeth plates 20 and the spacer plates 21 are made from a suitable hardened steel, and it will be seen that any number of teeth plates 20 and spacer plates 21 can be used to make a gear rack means 15 of any desired length. It will be understood that the spacing of the teeth plates 20 relative to each other can be adjusted by merely grinding off the necessary amount of material from the spacer plates 21. The tolerance between the teeth plates 20 can thus be adjusted and kept to a minimum so as to permit positive reversal of a machine element which is driven by the drive means of the present invention. The gear rack means 15 of the present invention may be made more quickly than gear racks incorporating conventional teeth. FIG. 3 shows the tooth plates 20 being disposed at a helix angle relative to the longitudinal axis of the gear rack means 15. It will be understood that any desired helix angle may be used as, for example, a helix angle of 1°, 8 minutes and 22 seconds.

It will be understood that the square tooth gear rack means 15 provides a gear rack means with no backlash and no override. An advantage of the gear rack means 15 is that the square teeth plates 20 and the spacer plates 21 may be used as standard items for the stocking of these parts so that a gear rack means 15 can be quickly and easily made and delivered in a minimum of time after an order for the same. Another advantage of the gear rack means 15 over the prior art type gear racks is that it does not need a large amount of maintenance which results in less down-time and cheaper maintenance.

Figure 7:
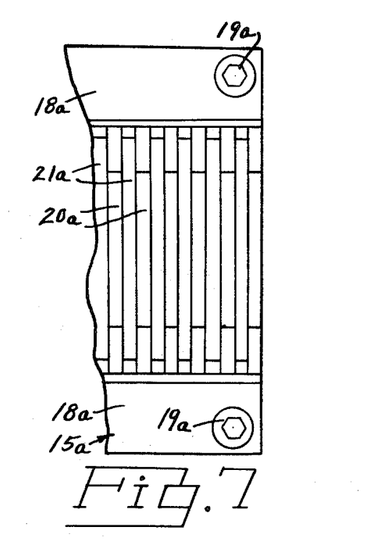
FIG. 7 is a fragmentary, plan view of a modified gear rack means, showing the rack teeth disposed perpendicular to the longitudinal axis of the rack means.

FIG. 7 is a fragmentary plan view of a modified gear rack means 15a showing the gear rack teeth 20a disposed perpendicular to the longitudinal axis of the gear rack means. The parts of the modified structure of FIG. 7 which are the same as the structure illustrated in FIGS. 3 and 6, have been marked with the same reference numerals followed by the small letter *a*.

Figure 8:
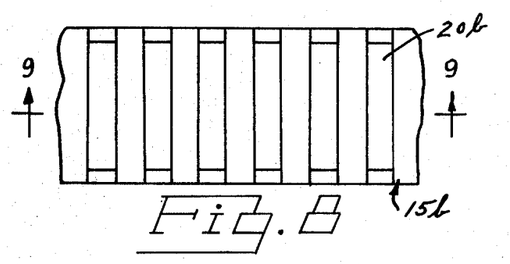
FIG. 8 is a fragmentary, plan view of a modified type of integrally formed square teeth for a gear rack.
Figure 9:
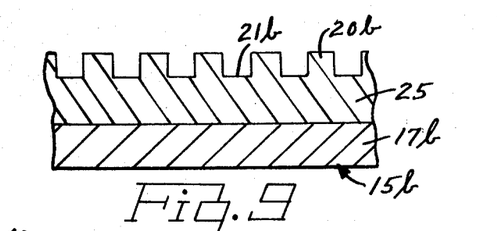
FIG. 9 is a fragmentary, elevational, section view of the structure illustrated in FIG. 8, taken along the line 9—9 thereof, and looking in the direction of the arrows.

FIG. 8 is a fragmentary plan view of a modified type of integrally formed square teeth for a gear rack means 15b. FIG. 9 is a fragmentary elevational section view of the structure illustrated in FIG. 8, taken along the line 9—9 thereof, and looking in the direction of the arrows. FIG. 8 shows the square teeth 20b integrally formed and spaced apart by the spacer lands 21b. The teeth are integrally formed on a suitable plate 25 which would be secured by any suitable machine screws to a mounting plate 17b. The teeth 20b are shown as being disposed perpendicular to the longitudinal axis of the gear rack means 15b, but it will be understood that they may also be formed on a helix angle as shown by the helically disposed teeth 20 of the gear rack means 15 in FIG. 3.

Figure 2:
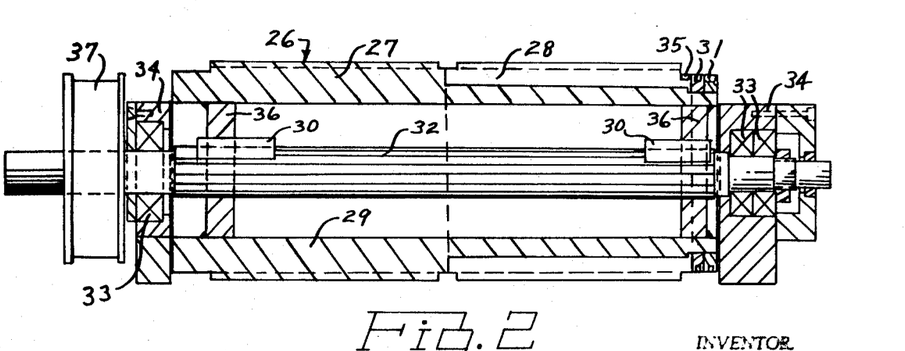
FIG. 2 is a fragmentary, enlarged, elevational, section view of the structure illustrated in FIG. 1 taken along the line 2—2 thereof, and looking in the direction of the arrows.

As shown in FIG. 1, the vertical column 13 carries a rotatable drive worm 26 which is adapted to operatively engage the gear rack means 15 for moving the machine element 13 relative to the stationary machine elements 11 and 12. As shown in FIG. 2, the drive worm 26 generally includes the two parts or tooth portions 27 and 28. The drive worm part 28 can be rotatably adjusted relative to the part 27 and axially spaced by suitable shims to eliminate any backlash and override when the machine element 13 is reversed in its movement relative to the stationary machine elements 11 and 12. The drive worm tooth portions 27 and 28 in FIG. 2 have been schematically shown without indicating any particular type of thread tooth.

The tooth carrying drive worm part 27 is formed as an integral part of a cylindrical body 29. The drive worm part 28 is rotatably mounted on the cylindrical body 29 and held in a selected axially adjusted position by suitable lock collars 31. The drive worm body 29 is operatively mounted by the affixed annular plates 36 stud a shaft 32 which is rotatably mounted on suitable ball bearing means 33. The cylindrical body 29 is secured to the shaft 32 by any suitable means, as by the keys 30 engaging the plates 36. The drive worm part 28 may be rotatably adjusted by suitable means, as by a spanner wrench engaged in the socket 35. The bearing means 33 are operatively mounted in support members 34 which are secured to the vertical column 13 by any suitable means. A belt pulley 37 is fixedly secured to one end of the drive worm shaft 32. As shown in FIG. 1, a drive belt 38 is operatively mounted over the pulley 37 and a similar pulley on the output drive shaft of a suitable reversible drive motor 39, as for example, an electric motor. The motor 39 is secured by any suitable means to the vertical column 13.

Figure 4:
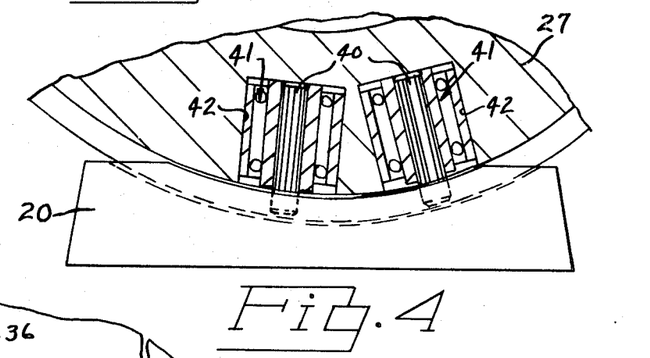
FIG. 4 is a fragmentary, enlarged, elevational, section view of the structure illustrated in FIG. 3, taken along the line 4—4 thereof, and looking in the direction of the arrows.

FIGS. 3, 4 and 5 illustrate a first illustrative drive worm 26 which is provided with helically formed threads or teeth comprising a plurality of studs 40. The studs 40 are each operatively mounted in a suitable sealed ball-bearing means 41, or the like, as by a press fit. The sealed bearing means 41 are each press fitted into a suitable bore 42 in the periphery of the particular drive worm parts 27 and 28. As schematically illustrated in FIG. 3, a plurality of the studs 40 are mounted on helix lines around the drive worm parts 27 and 28 to form a drive worm comprising stud type teeth which co-act with the gear rack square teeth 20.

The stud type teeth on the drive worm 26, formed by the studs 40, provide a drive worm for co-action with the gear rack means 15 which provides no backlash and no override when one machine element is moved relative to another. The tolerances between the studs 40 and the square teeth 20 can be held to a minimum. An advantage of the stud type teeth is that the line of contact between the studs 40 and the gear rack teeth 20 is changing continuously since the studs 40 rotate in the bearing means 41. The last mentioned function is an advantage because it provides a drive means wherein the accuracy between the meshing parts can be maintained over a longer period of time than with the prior art type of drive worm and gear rack means. This functioning also provides a drive means which involves less maintenance and cheaper maintenance, with less down-time. It is a quick and easy matter to repair the stud teeth on the drive worm 26, since the studs 40 can be quickly and easily replaced, if needed.

Figure 10:
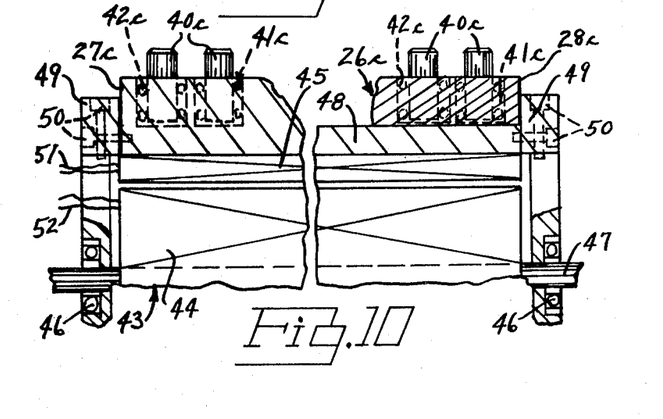
FIG. 10 is a fragmentary, broken, longitudinal, section view of an electric motor having the drive worm mounted on the rotor.

FIG. 10 is a fragmentary, schematic longitudinal section view of a reversible electric motor having a drive worm 26c mounted on the rotor of the electric motor. The details of the motor have been generally indicated and it will be understood that any suitable, reversible electric motor of this type may be employed. The parts of the drive worm structure which are the same as the drive worm structure illustrated hereinbefore have been marked with the same reference numerals followed by the small letter c. The numeral 43 generally indicates the electric motor which is provided with a stationary internal stator and a rotatable external rotor 45. The rotor 45 is carried on a housing which is rotatably mounted on suitable bearing means 46 on a motor shaft 47. The drive worm part 27c is integrally formed on a cylindrical rotor sleeve 48 and the drive worm part 28c is separately formed and rotatably mounted on the rotor sleeve 48. The sleeve 48 is held on said housing by a pair of lock rings 49 and a plurality of suitable socket head screws 50. One of the lock rings 49 also functions to hold the drive worm part 28c in an adjusted position relative to the drive worm part 27c. The drive worm 26c would function in the same manner as the previously described drive worm 26. The stator 44 and the rotor 45 would be operatively connected to a suitable power source by suitable leads as 51 and 52.

Figure 11:
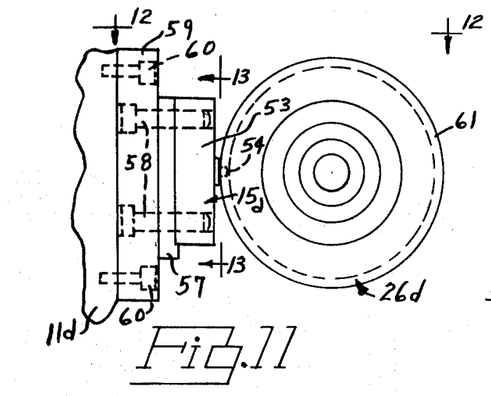
FIG. 11 is a fragmentary, elevational, end view of another illustrative embodiment of the invention, and showing a gear rack provided with stud teeth and a drive worm provided with thread-type teeth.
Figure 12:
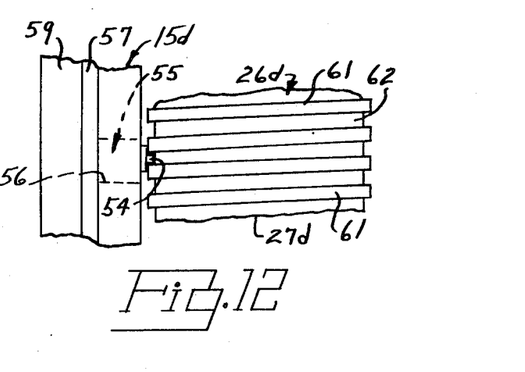
FIG. 12 is a fragmentary, horizontal, plan view of the structure illustrated in FIG. 11, taken along the line 12—12 thereof, and looking in the direction of the arrows.

FIGS. 11 through 14 illustrate a modified embodiment of the invention wherein a gear rack drive means 15d is provided with stud teeth and the drive worm 26d is provided with square teeth. FIG. 11 is a fragmentary, elevational, end view of a gear rack means provided with stud teeth and which is adapted to mesh with a drive worm 26d provided with square type teeth 61 which are integrally formed on the drive worm 26d and spaced by the lands 62. The drive worm 26d would also be provided with two relatively adjustable parts in the same manner as the aforedescribed drive worms.

Figure 13:
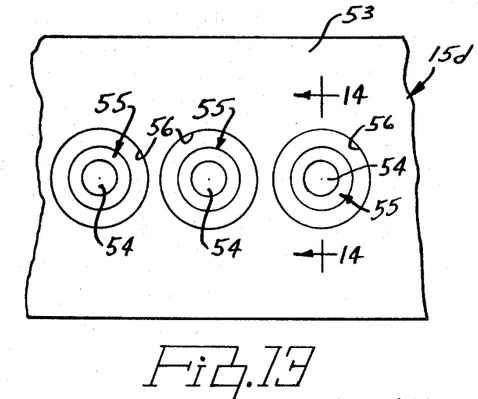
FIG. 13 is an elevational view of the gear rack means illustrated in FIG. 11, taken along the line 13—13 thereof, and looking in the direction of the arrows.
Figure 14:
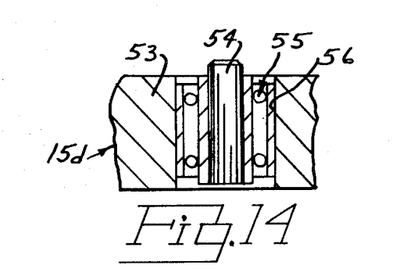
FIG. 14 is a fragmentary, elevational, section view of the structure illustrated in FIG. 13, taken along the line 14—14 thereof, and looking in the direction of the arrows.

As shown in FIG. 13, the gear rack means 15d is provided with stud teeth and it includes an elongated mounting plate 53 on which are longitudinally aligned a plurality of evenly spaced apart studs 54. The studs 54 are rotatably mounted in suitable sealed bearing means 55 which are press fitted into the bores 56 in the mounting plate 53. The mounting plate 53 is vertically disposed on the outer face of a support plate 57 (FIG. 11) by a plurality of suitable socket head screws 58. The studs 54 are shown as being disposed on a horizontal plane. The support plate 57 is also attached by the socket head screws 58 to a second support plate 59 which is secured by suitable socket head screws 60 to a machine element as a stationary table 11d.

Figure 15:
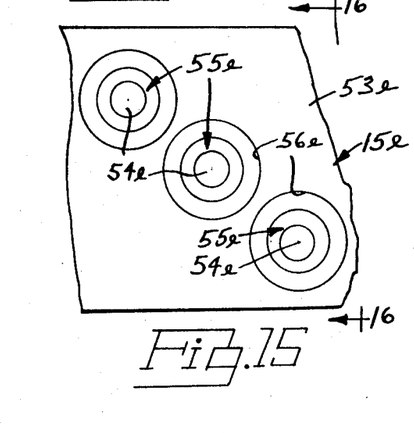
FIG. 15 is a fragmentary, plan view of a modified gear rack provided with stud teeth, and wherein the studs are disposed in groups with their centers on a helix line.
Figure 16:
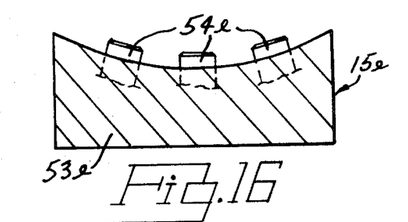
FIG. 16 is an elevational, section view of the structure illustrated in FIG. 15, taken along the line 16—16 thereof, and looking in the direction of the arrows.

FIGS. 15 and 16 illustrate a modification of the disposition of the studs for a stud teeth type gear rack means 15e. The parts illustrated in FIGS. 15 and 16 which are the same as those shown in FIGS. 11 through 14 have been marked with the same reference numerals followed by the small letter e. The disposition of the studs 54e illustrates that these studs can be transversely disposed on a helix angle, or on any other angle, as desired. FIG. 16 also illustrates that the upper face of the mounting plate 53e may be formed concave for an operative relationship with a drive worm as 26d.

Figure 17:
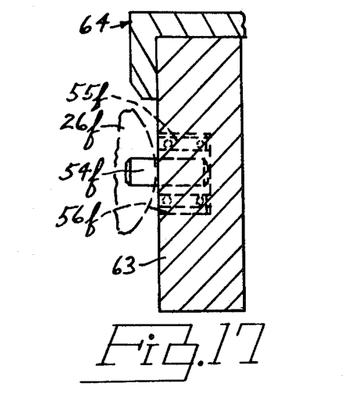
FIG. 17 is a fragmentary, elevational view of a machine tool way, and illustrating the incorporation of the gear rack stud teeth as a part of the machine way.

FIG. 17 illustrates the forming of a gear rack means on a machine way 63. The numeral 64 generally designates a machine element slidably mounted on the machine way 63. The parts of the gear rack means shown in FIG. 17 which are the same as the previously described embodiments are marked with the same reference numerals followed by the small letter f.

Figures 18, 19, 20, 21, 22, 23, 24, 25, 26:
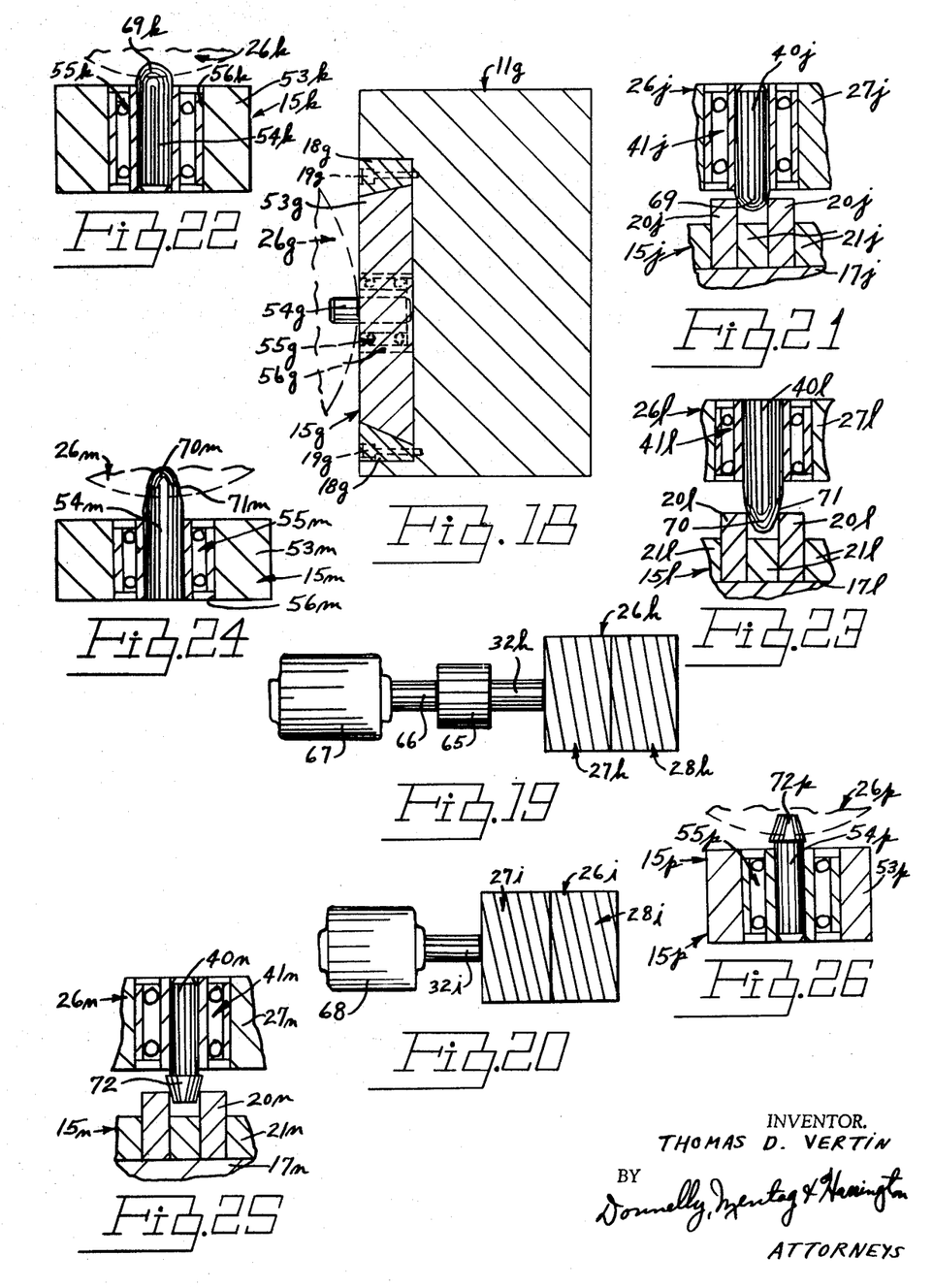
FIG. 18 is a fragmentary, elevational view of a machine tool part and illustrating the incorporation of the gear rack stud teeth as a part of a machine element.
FIGS. 19 and 20 illustrate two types of in-line drive motors for the drive worm.
FIG. 21 is a fragmentary, elevational, section view of a drive worm provided with ball nose type stud teeth.
FIG. 22 is a fragmentary, elevational, section view of a gear rack provided with ball nose type stud teeth.
FIG. 23 is a fragmentary, elevational, section view of a drive worm provided with stud teeth having a conically shaped nose.
FIG. 24 is a fragmentary, elevational, section view of a gear rack provided with stud teeth having a conically shaped nose.
FIG. 25 is a fragmentary, elevational, section view of a drive worm provided with stud teeth having a second type of conically shaped nose.
FIG. 26 is a fragmentary, elevational, section view of a gear rack provided with stud teeth having a second type of conically shaped nose.

FIG. 18 is a fragmentary, elevational section view of a machine tool element, such as a stationary machine table 11g, which has been provided with a gear rack means 15g. The gear rack means 15g has stud type teeth and is incorporated as a part of the machine element 11g. The parts of the gear rack means 15g which are the same as the gear rack means of FIGS. 11 through 14 have been marked with the same reference numerals followed by the small letter g.

FIG. 19 illustrates a first type of in-line drive motor for driving a drive worm made in accordance with the principles of the present invention. The numeral 26h designates generally a drive worm made in accordance with the principles of the present invention and which includes the two drive worm parts 27h and 28h. The drive worm shaft 32h is operatively connected by a suitable coupling 65 to the output drive shaft 66 of a suitable reversible electric motor 67.

FIG. 20 illustrates a second type of in-line drive motor for driving a drive worm made in accordance with principles of the present invention. The numeral 26i designates generally a drive worm made in accordance with the principles of the present invention and which includes the two drive worm parts 27i and 28i. The drive worm shaft 32i is integrally connected to the output drive shaft of a suitable reversible electric motor 68. The direct mounting of the motor 68 and the drive worm 26i on the common shaft 32i eliminates any chance of lost movement between the drive motor 68 and the drive worm 26i.

FIG. 21 illustrates a ball nose type of stud for use in the drive worm of the invention. The drive worm and gear rack parts illustrated in FIG. 21 which correspond to parts of the embodiment of FIGS. 1 through 6 have been marked with the same reference numerals followed by the small letter j. The stud 40j is provided with a ball nose 69 which operatively engages and meshes with the gear rack teeth 20j. The drive worm 26j functions with the gear rack 15j in the same manner as described hereinbefore for the embodiment of FIGS. 1 through 6.

FIG. 22 illustrates a ball nose type of stud for use in the gear rack of the invention. The drive worm and gear rack parts illustrated in FIG. 22 which correspond with the parts of the embodiment of FIGS. 11 through 14 have been marked with the same reference numerals followed by the small letter $k$. The stud 54$k$ is provided with a ball nose 69$k$ which operatively engages and meshes with the drive worm teeth on the drive worm 26$k$. The drive worm 26$k$ functions with the gear rack 15$k$ in the same manner as described hereinbefore for the embodiment of FIGS. 11 through 14.

FIG. 23 illustrates a conically shaped nose type stud for use in the drive worm of the invention. The drive worm and gear rack parts illustrated in FIG. 23 which correspond to the parts of the embodiment of FIGS. 1 through 6 have been marked with the same reference numerals followed by the small letter $l$. The stud 40$l$ is provided with a conically shaped nose 70 which is rounded on the end and provided with a tapered peripheral side 71 that engages and meshes with the gear rack teeth 20$l$. The drive worm 26$l$ functions with the gear rack 15$l$ in the same manner as described hereinbefore for the embodiment of FIGS. 1 through 6.

FIG. 24 illustrates a conically shaped nose type stud for use in the gear rack of the invention. The drive worm and gear rack parts illustrated in FIG. 24 which correspond to the parts of the embodiment of FIGS. 11 through 14 are marked with the same reference numerals followed by the small letter $m$. The 54$m$ is provided with a conically shaped nose 70$m$ which is rounded on the end and provided with a tapered peripheral side 71$m$ that engages and meshes with the drive worm teeth on the drive worm 26$m$. The drive worm 26$m$ functions with the gear rack 15$m$ in the same manner as described hereinbefore for the embodiment of FIGS. 11 through 14.

FIG. 25 illustrates a second type of conically shaped nose stud for use in the drive worm of the invention. The drive worm and gear rack parts illustrated in FIG. 25 which correspond to parts of the embodiment of FIGS. 1 through 6 have been marked with the same reference numerals followed by the small letter $n$. The stud 40$n$ is provided with a frusto-conically shaped or tapered nose 72 which operatively engages and meshes with the gear rack teeth 20$n$. The drive worm 26$n$ functions with the gear rack 15$n$ in the same manner as described hereinbefore for the embodiment of FIGS. 1 through 6.

FIG. 26 illustrates a second type of conically shaped nose stud for use in the gear rack of the invention. The drive worm and gear rack parts illustrated in FIG. 26 which correspond with the parts of the embodiment of FIGS. 11 through 14 have been marked with the same reference numerals followed by the small letter $p$. The stud 54$p$ is provided with a frusto-conically shaped or tapered nose 72$p$ which operatively engages and meshes with drive worm teeth on the drive worm 26$p$. The drive worm 26$p$ functions with the gear rack 15$p$ in the same manner as described hereinbefore for the embodiment of FIGS. 11 through 14.

Both of the aforedescribed drive worm means operate with their respective gear rack means to drive one machine element relative to another in an efficient manner. Experience has shown that a machine provided with a drive means of the present invention may be operated with a minimum of power and that a machine element can also be braked relative to another machine element with a minimum of power.

The side thrust which is present in the prior art worm drive and gear rack means is minimized in the structure of the present invention since the thrust generated is evenly distributed in the direction of travel on the rack means. It will be seen that the drive worm part 28 can be rotatably adjusted on the cylindrical body 29 so as to provide a pre-load pressure by the drive worm on the gear rack to hold these parts together. It will be understood that spacing shims may also be disposed between the inner ends of the drive worm parts 27 and 28 for adjusting the pre-load pressure as desired. As viewed in FIG. 5, the pre-load on the gear rack teeth 20 would thus be imposed by the drive worm part 27 stud teeth 40 exerting a constant longitudinally directed pressure to the left as viewed in FIG. 5 against the mating gear rack teeth 20 and the drive worm part 28 stud teeth 40 exerting a constant longitudinally directed pressure to the right in the opposite direction against the mating gear rack teeth 20.

The pre-load pressure on the drive worm and gear rack means may be adjusted up to or about the cutting tool load. The pre-load would be adjusted in accordance with the heaviest cut. It will be understood that the preload could be adjusted to provide for different cutting tool loads which would vary in accordance with the type of cutting tool and the material of the workpiece. Also, it will be understood that the drive means of the present invention could be used on drafting machines whereby the pre-load would be lower than when the invention is used on a metal working machine or a wood working machine.

The pre-load pressure on the drive worm and gear rack means eliminates any interruption in the cutting action of a tool on a workpiece when a machine element carrying the tool or workpiece is reversed, as in contour cutting. The prior art drive worms are long and of a small diameter, and a winding up and unwinding torsion effect is created when the prior art drive worms are reversed. This disadvantageous effect is not present in the drive worm and gear rack means of the present invention because of the aforementioned pre-load and the fact that the drive worm of the present invention is made to a short length and with a large diameter. The short length drive worm and large diameter also provides a fine resolution or increment of travel which is not possible with the prior art drive means. A further advantage of the pre-load pressure on the drive worm and gear rack of the present invention is that no other pressure is needed to maintain contact between the drive means members so as to minimize friction and provide a plurality of lines of contact between the drive worm and the gear rack means. The preload feature of the present invention also permits a machine tool provided with the drive means of the present invention to microfinish surfaces of a workpiece, and the mating surfaces or contacting surfaces of the drive worm and gear rack means may be hardened to equal degrees of hardness because of the minimum friction characteristic of the drive means of the present invention. It will be understood that in the prior art devices, one of the mating surfaces on the drive worm and gear rack means is always provided with a harder surface than the other mating surface. The in-line drive means of the present invention provides a power drive means for the drive worm which eliminates lost motion normally inherent in the prior art drive means, and this feature further adds to the fine resolution or increment of travel obtainable from a drive means made in accordance with the present invention. It will be understood that the tables 11 and 12 are conventional workpiece and model or template supporting tables and that the cutting tool and tracer mechanism is carried by the machine element 14.

While it will be apparent that the preferred embodiments of the invention herein disclosed are well calculated to fulfill the objects above stated, it will be appreciated that the invention is susceptible to modification, variation and change.

What I claim is:

1. In a machine element drive means for moving one machine element relative to another machine element, the combination including:
   a. a first part comprising a gear rack means on one of said machine elements and being provided with a plurality of teeth;
   b. a second part comprising a rotatable drive worm means operatively mounted on the other of said machine elements and in meshing driving engagement with said gear rack means, whereby when said drive worm means is rotated in said gear rack means a relative movement between said machine elements is produced;
   c. one of said drive means parts being provided with teeth comprising a plurality of studs; and,
   d. the other of said drive means parts being provided with square teeth.

2. A machine element drive means as defined in claim 1, wherein:
   a. said studs are each rotatably mounted in bearing means.

3. A machine element drive means as defined in claim 1, wherein said drive worm means includes:
   a. two drive worm parts; and,
   b. means for rotatably adjusting the drive worm parts relative to each other and for releasably securing said two drive worm parts together to provide a preload pressure by said drive worm parts on the gear rack means.

4. A machine element drive means as defined in claim 3, wherein:
   a. a plurality of driving contacts are provided between said drive worm means and gear rack means.

5. A machine element drive means as defined in claim 3, wherein:
   a. one of said drive worm parts is adjustably rotatable relative to the other of said drive worm parts.

6. A machine element drive means as defined in claim 3, wherein:
   a. the preload pressure between the drive worm parts and the gear rack means may be adjusted up to and above the cutting tool load.

7. A machine element drive means as defined in claim 1, including:
   a. power drive means connected to said drive worm means for rotating the drive worm means.

8. A machine element drive means as defined in claim 7, wherein:
   a. said power drive means comprises an electric motor having a stator armature and a rotor winding member; and,
   b. said drive worm means is operatively mounted on said rotor winding member.

9. A machine element drive means as defined in claim 7, wherein said power drive means comprises:
   a. an electric motor mounted on said other of said machine elements; and,
   b. a pulley and drive belt means operatively connecting said electric motor to said drive worm means.

10. A machine element drive means as defined in claim 7, wherein said power drive means comprises:
    a. an electric motor having a drive shaft coupled in alignment with a shaft rotatably supporting the drive worm means.

11. A machine element drive means as defined in claim 7, wherein said power drive means comprises:
    a. an electric motor having a drive shaft integrally connected to a shaft rotatably supporting said drive worm means.

12. A machine element drive means as defined in claim 1, wherein:
    a. the drive worm means and gear rack means meshing with and engaging surfaces are hardened to an equal degree.

13. A machine element drive means as defined in claim 1, wherein: rotatably
    a. said teeth comprising a plurality of studs are formed on the drive worm means and include a plurality of radially disposed studs which are each rotatably mounted in bearing means and positioned about the axis of the rotation of the drive worm means; and,
    b. said gear rack means is provided with said square teeth.

14. A machine element drive means as defined in claim 13, wherein:
    a. said drive worm means comprises two parts;
    b. said drive worm means includes means for releasably securing said two drive worm parts together; and,
    c. said plurality of studs on the drive worm means are mounted on the two drive worm parts on a helix angle.

15. In a machine element drive means for moving one machine element relative to another machine element, the combination including:
    a. a first part comprising a gear rack means on one of said machine elements and being provided with a plurality of teeth;
    b. a second part comprising a rotatable drive worm means operatively mounted on the other of said machine elements and in meshing driving engagement with said gear rack means, whereby when said drive worm means is rotated in said gear rack means a relative movement between said machine elements is produced;
    c. one of said drive means parts being provided with teeth comprising a plurality of studs;
    d. the other of said drive means parts being provided with square teeth;
    e. said teeth comprising a plurality of studs which are formed on the drive worm means and which include a plurality of radially disposed studs which are each rotatably mounted in bearing means and positioned about the axis of the rotation of the drive worm means;

f. said gear rack means being provided with said square teeth;

g. each of said gear rack means square teeth being made separately; and, h. said separately made square teeth being assembled together to comprise said gear rack means.

16. A machine element drive means as defined in claim 15, wherein:

a. each of said separately made gear rack means square teeth is made as a separate flat plate.

17. A machine element drive means as defined in claim 16, including:

a. spacer means for spacing apart said separately made square teeth flat plates.

18. A machine element drive means as defined in claim 17, wherein said gear rack means comprises:

a. a mounting block secured to said one machine element;

b. said plurality of square teeth flat plates being mounted on said block and spaced by said spacer means; and, c. locking means for releasably locking said square teeth flat plates to said block.

19. A machine element drive means as defined in claim 18, wherein:

a. said spacer means comprises a plurality of spacer members.

20. A machine element drive means as defined in claim 19, wherein:

a. said plurality of spacer members comprise a plurality of spacer plates.

21. A machine element drive means as defined in claim 18, wherein:

a. said square teeth flat plates are disposed perpendicular to the longitudinal axis of the gear rack means.

22. A machine element drive means as defined in claim 18, wherein:

a. said square teeth flat plates are disposed nonperpendicular relative to the longitudinal axis of the gear rack means.

23. A machine element drive means as defined in claim 13, wherein:

a. said square teeth are integrally formed on an elongated base member.

24. A machine element drive means as defined in claim 1, wherein:

a. said gear rack means is formed on a machine element way.

25. A machine element drive means as defined in claim 1, wherein:

a. said gear rack means is formed on a machine element.

26. A machine element drive means as defined in claim 1, wherein:

a. said teeth comprising a plurality of studs are formed on the gear rack means; and, b. said drive worm means is provided with said square teeth.

27. A machine element drive means as defined in claim 26, wherein said drive worm means includes:

a. two drive worm parts;

b. means for releasably securing two drive worm parts together; and, c. said square teeth are helically formed on said two drive worm parts about the axis of rotation of the drive worm parts.

28. A machine element drive means as defined in claim 26, wherein:

a. said studs are rotatably mounted in bearing means in longitudinally aligned, spaced apart positions on a support means.

29. In a machine element drive means for moving one machine element relative to another machine element, the combination including:

a. a first part comprising a gear rack means on one of said machine elements and being provided with a plurality of teeth;

b. a second part comprising a rotatable drive worm means operatively mounted on the other of said machine elements and in meshing driving engagement with said gear rack means, whereby when said drive worm means is rotated in said gear rack means a relative movement between said machine elements is produced;

c. one of said drive means parts being provided with teeth comprising a plurality of studs;

d. the other of said drive means parts being provided with square teeth;

e. said teeth comprising a plurality of studs which are formed on the gear rack means;

f. said drive worm means being provided with said square teeth;

g. said studs being rotatably mounted in bearing means on a support means; and, h. said studs being disposed in helically disposed lines along the support means to simulate helically formed teeth on a support means.

30. A machine element drive means as defined in claim 19, wherein:

a. said helically disposed studs are mounted on a concave upper face on a support means.

31. A machine element drive means as defined in claim 13, wherein:

a. said studs on the drive worm means are each provided with cylindrically shaped nose having straight, axially extended, peripheral sides which engage the teeth on the gear rack means.

32. A machine element drive means as defined in claim 13, wherein:

a. said studs on the drive worm means each provided with a ball shaped nose which engages the teeth on the gear rack means.

33. A machine element drive means as defined in claim 13, wherein:

a. said studs on the drive worm means are each provided with a conically shaped nose which engages the teeth on the gear rack means.

34. A machine element drive means as defined in claim 33, wherein:

a. said conically shaped nose is provided with a rounded end and a tapered peripheral side which is tapered toward the rounded end.

35. A machine element drive means as defined in claim 33, wherein:

a. said conically shaped nose is frusto-conically shaped.

36. A machine element drive means as defined in claim 26, wherein:

a. said studs on the gear rack means are each provided with a cylindrically shaped nose having straight, axially extended, peripheral sides which engage the teeth on the drive worm means.

37. A machine element drive means as defined in claim 26, wherein:
a. said studs on the gear rack means are each provided with a ball shaped nose which engages the teeth on the drive worm means.

38. A machine element drive means as defined in claim 26, wherein:
a. said studs on the gear rack means are each provided with a conically shaped nose which engages the teeth on the drive worm means.

39. A machine element drive means as defined in claim 38, wherein:
a. said conically shaped nose is provided with a rounded end and a tapered peripheral side which is tapered toward the rounded end.

40. A machine element drive means as defined in claim 38, wherein:
a. said conically shaped nose is frusto-conically shaped.

* * * * *

UNITED STATES PATENT OFFICE
CERTIFICATE OF CORRECTION

Patent No. 3,720,115                    Dated March 15, 1973

Inventor(s)    THOMAS D. VERTIN

It is certified that error appears in the above-identified patent and that said Letters Patent are hereby corrected as shown below:

Column 1, line 8, after "of" insert -- a --.
Column 3, line 1, "track" should be -- rack --.
Column 5, line 24, "sown" should be -- shown --.
Column 6, line 40, "stud" should be -- on --.
Column 9, line 30, after "The" insert -- stud --.
Column 14, claim 30, line 2 of preamble "claim 19" should be -- claim 29 --.
Column 14, claim 31, element (a) line 2, after "with" insert -- a --.

Signed and sealed this 10th day of July 1973.

(SEAL)
Attest:

EDWARD M. FLETCHER, JR.            Rene Tegtmeyer
Attesting Officer                  Acting Commissioner of Patents